(12) United States Patent
Onodera et al.

(10) Patent No.: US 9,168,910 B2
(45) Date of Patent: Oct. 27, 2015

(54) CONTROL APPARATUS FOR VEHICLE

(71) Applicant: HONDA MOTOR CO., LTD., Tokyo (JP)

(72) Inventors: Takayuki Onodera, Wako (JP); Kohei Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/006,907

(22) PCT Filed: May 9, 2013

(86) PCT No.: PCT/JP2013/062999
§ 371 (c)(1),
(2) Date: Sep. 23, 2013

(87) PCT Pub. No.: WO2014/013774
PCT Pub. Date: Jan. 23, 2014

(65) Prior Publication Data
US 2015/0119195 A1   Apr. 30, 2015

(30) Foreign Application Priority Data

Jul. 16, 2012   (JP) ................................ 2012-158205

(51) Int. Cl.
*B60W 10/06*   (2006.01)
*B60W 10/107*   (2012.01)
(Continued)

(52) U.S. Cl.
CPC ............. *B60W 10/107* (2013.01); *B60W 10/06* (2013.01); *F02D 29/00* (2013.01); *F16H 63/50* (2013.01); *F16H 61/66259* (2013.01); *F16H 2059/704* (2013.01); *F16H 2312/14* (2013.01)

(58) Field of Classification Search
None
See application file for complete search history.

(56) References Cited

U.S. PATENT DOCUMENTS 5,289,741 A * 3/1994 Debs et al. ..................... 475/123
6,275,759 B1 * 8/2001 Nakajima et al. ............... 701/54
(Continued)

FOREIGN PATENT DOCUMENTS

JP   2001-224104 A   8/2001
JP   2005-351282 A   12/2005
(Continued)

OTHER PUBLICATIONS

International Search Report of PCT/JP2013/062999, mailing date of Jun. 11, 2013.
(Continued)

*Primary Examiner* — Ramya Burgess
*Assistant Examiner* — David Morris
(74) *Attorney, Agent, or Firm* — Westerman, Hattori, Daniels & Adrian, LLP

(57) ABSTRACT

A control apparatus controls a vehicle provided with an internal combustion engine, an oil pump actuated by the engine for pressurizing operation oil, and a belt-type continuously variable transmission to which the pressurized operation oil is supplied. An automatic stop of the engine is performed when a predetermined condition is satisfied. A transmission ratio of the continuously variable transmission is detected, and a continuable time period of the automatic stop of the engine is set according to the detected transmission ratio upon automatically stopping the engine. The automatic stop is controlled to end when a continuation time period of the automatic stop of the engine expires. Good vehicle start performance can be obtained when restarting the engine after the automatic stop, regardless of the brake operation manner and the like upon stopping the vehicle.

16 Claims, 5 Drawing Sheets

(51) Int. Cl.
*F02D 29/00* (2006.01)
*F16H 63/50* (2006.01)
*F16H 61/662* (2006.01)
*F16H 59/70* (2006.01)

(56) References Cited

U.S. PATENT DOCUMENTS 6,335,573 B1 * 1/2002 Eguchi et al. ............... 290/40 C
6,881,170 B2 * 4/2005 Onoyama et al. ............ 477/39
7,247,123 B2 * 7/2007 Ohtake et al. ............... 477/98
7,316,630 B2 * 1/2008 Tsukada et al. ............. 477/3

FOREIGN PATENT DOCUMENTS

| JP | 2006-234013 A | 9/2006 |
| JP | 2008-001258 A | 1/2008 |
| JP | 2010-230132 A | 10/2010 |
| JP | 2012-002194 A | 1/2012 |

OTHER PUBLICATIONS

Written Opinion of PCT/JP2013/062999, mailing date of Jun. 11, 2013.

* cited by examiner

CONTROL APPARATUS FOR VEHICLE

TECHNICAL FIELD

The present invention relates to a control apparatus for a vehicle which is driven by an internal combustion engine and provided with an oil pump actuated by the internal combustion engine, and a belt-type continuously variable transmission controlled using operation oil pressurized by the oil pump.

BACKGROUND ART

Patent Document 1 (shown below) shows a control apparatus for a vehicle having an oil pump actuated by an internal combustion engine and a belt-type continuously variable transmission controlled with operation oil pressurized by the oil pump. In this control apparatus, a so-called idling stop is performed wherein the engine is automatically stopped when a predetermined condition (e.g., the vehicle speed is substantially "0" and the brake pedal is depressed) is satisfied.

According to this control apparatus, when the time period elapsed from the start time of the idling stop reaches a predetermined time period which is set according to an operation oil temperature, restart of the engine (compulsory restart) is performed even if the predetermined condition is satisfied. When the continuing time period of the idling stop becomes long, rise in the operation oil pressure upon terminating the idling stop (upon restarting the engine) may be delayed, which causes hesitation of the vehicle start performance. Such inconvenience is prevented by performing the above-described compulsory restart.

PRIOR ART DOCUMENT

Patent Document

Patent Document 1: Japanese Patent Laid-Open Publication No. 2010-230132

SUMMARY OF THE INVENTION

Problems to be Solved by the Invention

In the apparatus shown in Patent Document 1, the predetermined time period is set according to the operation oil temperature in order to prevent belt slippage upon restarting the engine from occurring, the belt slippage being caused by leakage of the operation oil from the piston chamber for actuating a pulley of the continuously variable transmission. The reason for the above setting of the predetermined time period is that the leakage amount of the operation oil changes depending on the operation oil temperature.

However, there still exists the following problem which is not solved only by considering the above-described leakage of the operation oil. That is, if the depressing force of the brake pedal applied by the driver upon stopping the vehicle is large, and hence the reduction rate of the wheel rotation speed is high, the idling stop may sometimes be performed before the transmission ratio of the continuously variable transmission returns to the maximum transmission ratio. If the transmission ratio is in such state, hesitation of the vehicle start may occur upon restarting the engine after the idling stop.

The present invention was made contemplating this point, and an objective of the present invention is to provide a control apparatus for a vehicle, which makes it possible to attain good vehicle start performance when restarting the engine after the idling stop (automatic engine stop) regardless of the transmission ratio of the continuously variable transmission upon the automatic engine stop.

Solution to the Problem

To attain the above objective, the present invention provides a control apparatus for a vehicle provided with an internal combustion engine (1), an oil pump (71) actuated by the engine for pressurizing operation oil, and a belt-type continuously variable transmission (4) to which the operation oil pressurized by the oil pump is supplied. The control apparatus is characterized by including oil pressure control means, automatic stop control means, transmission ratio detecting means, and continuable time period setting means. The oil pressure control means performs a transmission control by controlling an operation oil pressure supplied to the continuously variable transmission (4). The automatic stop control means automatically stops the engine (1) when a predetermined condition is satisfied. The transmission ratio detecting means detects a transmission ratio of the continuously variable transmission (4). The continuable time period setting means sets a continuable time period (TISMAX) of the automatic stop of the engine according to the detected transmission ratio (RTSTP) upon automatically stopping the engine. The automatic stop control means terminates the automatic stop of the engine when a continuation time period of the automatic stop of the engine reaches the continuable time period (TISMAX).

With this configuration, the continuable time period of the automatic stop of the engine is set according to the detected transmission ratio upon automatically stopping the engine, and the automatic stop of the engine is terminated, i.e., restart of the engine is performed, when the continuation time period of the automatic stop of the engine reaches the continuable time period. It is confirmed by the inventors of the present invention that the rising characteristic of the operation oil pressure becomes worse upon restart of the engine if the automatic stop is performed under the state where the transmission ratio of the continuously variable transmission has not returned to the maximum transmission ratio due to road surface condition or large reduction rate of the wheel rotation speed caused by large brake pedal depressing force of the driver, compared with the case where the automatic stop is performed after the transmission ratio has returned to the maximum the transmission ratio. Accordingly, by setting the continuable time period according to the transmission ratio upon automatically stopping the engine, the restart of the engine can be performed at an appropriate timing, thereby obtaining good vehicle start performance, without depending on the transmission ratio upon engine stoppage, in other words, regardless of the road surface condition or the brake operation manner of the driver.

Preferably, the control apparatus further includes operating condition determining means for determining whether the engine (1) and the continuously variable transmission (4) are in a predetermined operating condition. The continuable time period setting means sets the continuable time period (TISMAX) according to the detected transmission ratio (RTSTP) when the engine or the continuously variable transmission is not in the predetermined operating condition, while the continuable time period setting means sets the continuable time period (TISMAX) with another method when the engine and the continuously variable transmission are in the predetermined operating condition.

With this configuration, the continuable time period is set according to the detected transmission ratio when the engine or the continuously variable transmission is not in the predetermined operating condition, while the continuable time period is set with another method when the engine and the continuously variable transmission are in the predetermined operating condition. If the warming-up of the engine is completed, and hence the engine and the continuously variable transmission are in a stabilized operating condition, there may be a case where the setting of the continuable time period according to the detected transmission ratio is not necessary. In such case, the setting of the continuable time period can be performed with another method, for example, with a simplified method.

Preferably, the continuable time period setting means sets the continuable time period (TISMAX) to a less value as the transmission ratio (RTSTP) decreases.

It is to be noted that, in the present specification and claims, the "transmission ratio" is defined by an input shaft rotational speed (NDR)/an output shaft rotational speed (NDN) of the continuously variable transmission. Accordingly, reduction in the transmission ratio corresponds to a change in the direction toward a high speed transmission ratio.

With this configuration, the continuable time period is set to a less value as the transmission ratio decreases. Since a rising characteristic of the operation oil pressure becomes worse as the transmission ratio upon automatically stopping the engine, by setting the continuable time period to a less value as the transmission ratio decreases, it is possible to perform the restart of the engine at an appropriate timing.

Preferably, the control apparatus further includes temperature detecting means for detecting a temperature (TOIL) of the operation oil, and the continuable time period setting means sets the continuable time period (TISMAX) to a greater value as the operation oil temperature (TOIL) rises.

With this configuration, the continuable time period is set to a greater value as the operation oil temperature rises. Since leak of the operation oil decreases as the operation oil temperature rises, the operation oil pressure rising characteristic upon restarting the engine is improved. Accordingly, setting the continuable time period to a greater value as the operation oil temperature rises, makes it possible to perform the restart of the engine at an appropriate timing.

Preferably, the continuable time period setting means sets the continuable time period (TISMAX) on the basis of a state where the transmission ratio (RTSTP) is maximum.

With this configuration, the continuable time period is set on the basis of the state where the transmission ratio is maximum. The rising characteristic of the operation oil pressure becomes the best in the state where the transmission ratio is maximum, i.e., the state where the transmission ratio is the most suitable for the vehicle start. Accordingly, by setting the continuable time period on the basis of this state, the continuable time period can be set to an appropriate value.

Preferably, the automatic stop control means controls so that the automatic stop of the engine begins in a transition state where the vehicle shifts from a running state to a halting state. The continuable time period setting means sets the continuable time period (TISMAX) according to the transmission ratio (RTSTP) detected immediately before the vehicle stops.

With this configuration, the automatic stop of the engine begins in the transition state where the vehicle shifts from a running state to a halting state, and the continuable time period is set according to the transmission ratio detected immediately before the vehicle stops. Since the transmission ratio is surely and correctly detectable based on the input shaft rotational speed and the output shaft rotational speed of the continuously variable transmission before the vehicle stops, it is possible to appropriately set the continuable time period.

Preferably, the vehicle is provided with a clutch (22) disposed between an output shaft (11) of the engine and an input shaft (24) of the continuously variable transmission (4), the clutch (22) being controlled using the operation oil pressurized by the oil pump, and the control apparatus further includes monitoring means for monitoring a difference rotational speed (DNTD) between an input rotational speed (NT) and an output rotational speed (NDR) of the clutch, when the continuation time period of the automatic stop of the engine reaches the continuable time period (TISMAX) and the automatic stop ends. The continuable time period setting means includes modifying means for modifying a setting characteristic of the continuable time period (TISMAX) corresponding to the transmission ratio (RTSTP) according to the monitoring result by the monitoring means.

With this configuration, the difference rotational speed indicative of a slip amount of the clutch at the time of terminating the automatic stop of the engine, i.e., at the time of restarting the engine, is monitored, and the setting characteristic of the continuable time period corresponding to the transmission ratio is modified according to the monitoring result by the monitoring means. For example, the sealing characteristic of the seal ring for preventing leak of the operation oil, deteriorates by wear. Accordingly, a rotational speed difference of the clutch is generated due to deterioration of the rising characteristic of the operation oil pressure. Consequently, by modifying the setting characteristic so that the continuable time period becomes shorter, the restarting of the engine can be performed at an optimal timing and good vehicle start performance can be maintained regardless of aging changes in characteristic of the relevant parts.

Preferably, the continuable time period setting means sets the continuable time period (TIMAX) according to an average value (RTSTPAV) of detected past values of the transmission ratio, when the transmission ratio (RTSTP) is not able to be detected upon automatically stopping the engine.

With this configuration, the continuable time period is set according to the average value of detected past values of the transmission ratio, when the transmission ratio is not able to be detected upon automatically stopping the engine. Accordingly, the continuable time period can appropriately be set even when the transmission ratio is not able to be detected upon automatically stopping the engine due to any cause.

Preferably, the predetermined operating condition is a condition where a temperature difference between a coolant temperature of the engine and a temperature of the operation oil is within a predetermined range, and the continuable time period setting means sets the continuable time period to a greater value than the continuable time period that is set according to the detected transmission ratio, when the engine and the continuously variable transmission are in the predetermined operating condition.

With this configuration, the continuable time period is set to a greater value than the continuable time period that is set according to the detected transmission ratio, when the temperature difference between the engine coolant temperature and the operation oil temperature is within a predetermined range. Accordingly, improvement effect of the fuel efficiency attained by the automatic stop of the engine can be enhanced.

Preferably, the continuable time period setting means set the continuable time period to a fixed value which does not depend on the detected transmission ratio, when the engine and the continuously variable transmission are in the predetermined operating condition.

With this configuration, the continuable time period is set to a fixed value which does not depend on the detected transmission ratio, when the engine and the continuously variable transmission are in the predetermined operating condition. Accordingly, when restart of the engine is performed although the driver stops the vehicle and continues depressing the brake pedal, there is no difference in the restart timing, and a driver's sense of incongruity can be reduced.

MODE FOR CARRYING OUT THE INVENTION

Preferred embodiments of the present invention will now be described with reference to the drawings.

First Embodiment

Figure 1:
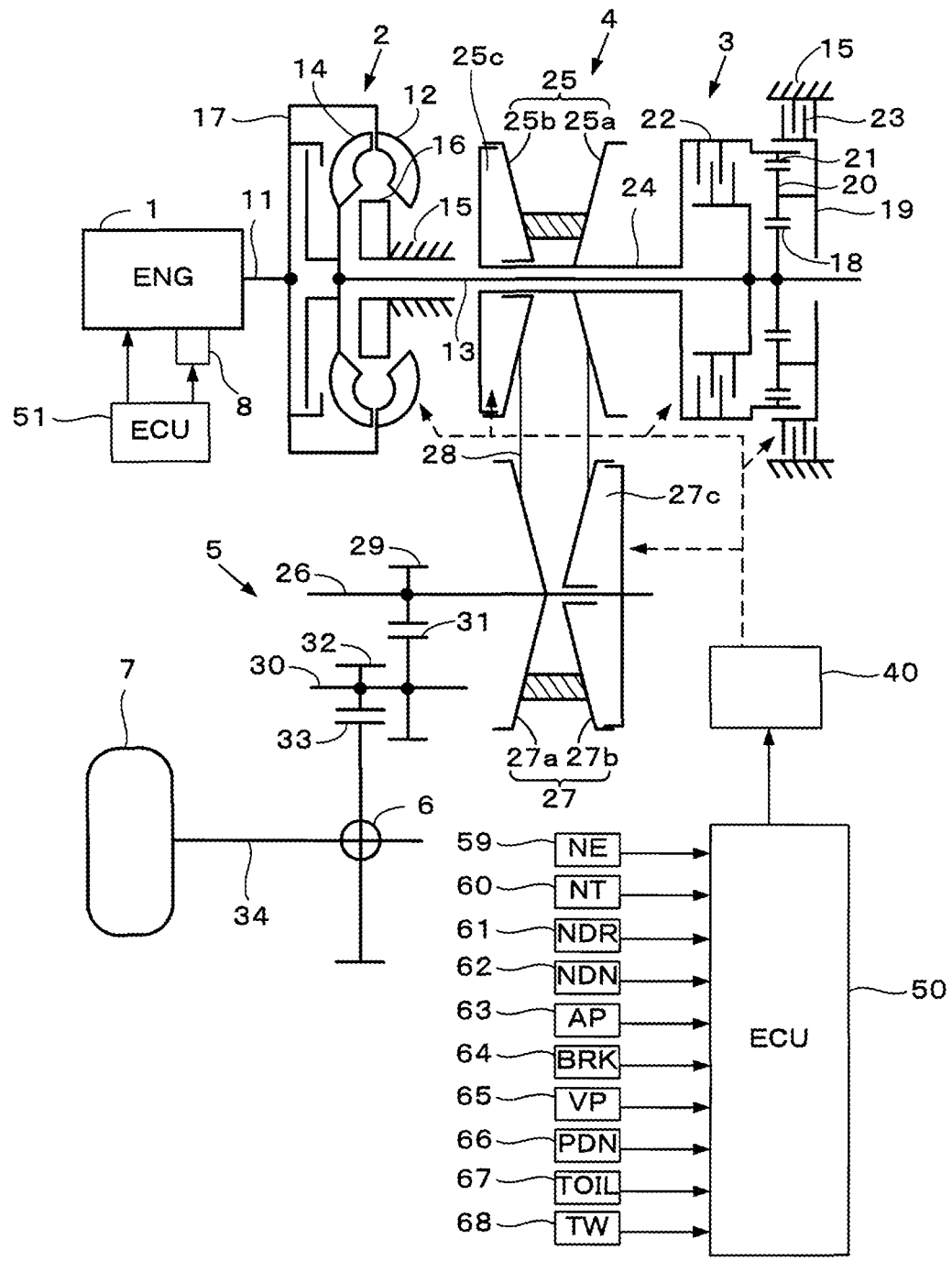
FIG. 1 A diagram showing a configuration of a vehicle power train including a belt-type continuously variable transmission according to one embodiment of the present invention FIG. 2 A diagram showing a hydraulic circuit for explaining a configuration of an oil pressure control device shown in FIG. 1

FIG. 1 shows a configuration of a vehicle power train including a belt-type continuously variable transmission according to one embodiment of the present invention. In FIG. 1, the driving force of an internal combustion engine (hereinafter referred to as "engine") 1 is transmitted to driving wheels 7 through a torque converter 2, a forward/backward switching mechanism 3, a belt-type continuously variable transmission (hereinafter referred to as "CVT") 4, a reduction-gear sequence 5, and a differential gear 6.

The torque converter 2 includes a pump 12 connected to the crankshaft 11 of the engine 1, a turbine 14 connected to an input shaft 13, a stator 16 fixed to a casing 15, and a lock-up clutch 17 for directly connecting the crankshaft 11 with the input shaft 13. When the lock-up clutch is disengaged, the torque converter 2 reduces a rotational speed of the crankshaft 11, amplifies a torque of the crankshaft 11, and transmits the amplified torque to the input shaft 13.

The forward/backward switching mechanism 3, which utilizes a planetary gear mechanism, includes a sun gear 18 fixed to the input shaft 13, a plurality of pinions 20 supported by a planetary carrier 19 and meshed with the sun gear 18, and a ring gear 21 meshing with the pinion 20. The ring gear 21 is configured so as to be connectable to the input shaft 13 through a forward clutch 22. The planetary carrier 19 is configured so as to be connectable to the casing 15 through the reverse brake 23.

When the forward clutch 22 is engaged, the input shaft 13 is directly connected to a pulley drive shaft 24 which is integrally formed with the ring gear 21, and the pulley drive shaft 24 rotates in the same direction at the same rotational speed as the input shaft 13. When the reverse brake 23 is engaged, the planetary carrier 19 is bound to the casing 5, and the pulley drive shaft 24 rotates in the opposite direction at a reduced rotational speed with respect to the rotation of the input shaft 13.

The CVT 4 includes a drive-pulley 25 supported by the pulley drive shaft 24, a driven-pulley 27 supported by an output shaft 26, and a metal belt 28 wound around the drive-pulley 25 and the driven-pulley 27. The drive-pulley 25 has a fixed pulley half-body 25a fixed to the pulley drive shaft 24, a movable pulley half-body 25b axially slidably but not rotatably supported by the pulley drive shaft 24, and two cylinder chambers 25c. The movable pulley half-body 25b is energized toward the fixed pulley half-body 25a with the oil pressure supplied to the cylinder chambers 25c. The driven-pulley 27 has a fixed pulley half-body 27a fixed to the output shaft 26, a movable pulley half-body 27b axially slidably but not rotatably supported by the output shaft 26, and a cylinder chamber 27c. The movable pulley half-body 27b is energized toward the fixed pulley half-body 27a with the oil pressure supplied to the cylinder chamber 27c. It is to be noted that a bias spring not shown is provided in the cylinder chamber 27c for energizing the movable pulley half-body 27b toward the fixed pulley half-body 27a.

By applying a first control oil pressure PDR to the cylinder chambers 25c of the drive-pulley 25, applying a second control oil pressure PDN to the cylinder chamber 27c of the driven-pulley 27, and reducing the first control oil pressure PDR, the movable pulley half-body 25b of the drive-pulley 25 moves away from the fixed pulley half-body 25a, and the effective diameter of the pulley decreases. Further, by increasing the second control oil pressure PDN, the movable pulley half-body 27b of the driven-pulley 27 moves closer to the fixed pulley half-body 27a, and the effective diameter of the pulley increases. Consequently, the transmission ratio RATIO of the CVT 4 increases (changes in the direction to a ratio suitable for the low speed running). It is to be noted that only one of the decrease in the first control oil pressure PDR and the increase in the second control oil pressure PDN makes the transmission ratio RATIO change similarly.

Inversely, by increasing the first control oil pressure PDN and reducing the second control oil pressure PDN, the movable pulley half-body 25b of the drive-pulley 25 moves closer to the fixed pulley half-body 25a, and the effective diameter of the pulley increases, and the movable pulley half-body 27b of the driven-pulley 27 moves away from the fixed pulley half-body 27a, and the effective diameter of the pulley decreases. Consequently, the transmission ratio RATIO of the CVT 4 decreases (changes in the direction to a ratio suitable for the high speed running). It is to be noted that only one of the increase in the first control oil pressure PDR and the decrease in the second control oil pressure PDN makes the transmission ratio RATIO change similarly.

A first reduction gear 29 fixed on the output shaft 26 meshes with a second reduction gear 31 fixed on a reduction shaft 30, and a final drive-gear 32 fixed on the reduction shaft 30 meshes with a final driven-gear 33 of the differential gear 6. The driving wheels 7 are mounted on right and left axles 34 extending from the differential gear 6.

The first and second control oil pressures PDR and PDN supplied to the cylinder chambers 25c and 27c of the CVT 4, and the operation oil pressures for actuating the forward clutch 22, the reverse brake 23, and the lock-up clutch 17 are controlled by an electronic control unit (hereinafter referred to as "ECU") 50 for controlling the transmission through an oil pressure control device 40.

The detection signals from the following sensors and other various sensors not shown are supplied to the ECU 50: an engine rotational speed sensor 59 for detecting an engine rotational speed NE, an input shaft rotational speed sensor 60 for detecting a rotational speed NT of the input shaft 13, a pulley drive shaft rotational speed sensor 61 for detecting a rotational speed NDR of the pulley drive shaft 24, an output shaft rotational speed sensor 62 for detecting a rotational speed NDN of the output shaft 26, an accelerator sensor 63 for detecting an operation amount AP of the accelerator pedal of the vehicle, a brake switch 64 for detecting depression of the brake pedal, a vehicle speed sensor 65 for detecting a running speed (vehicle speed) VP of the vehicle, a driven-pulley control oil pressure sensor 66 for detecting the second control oil pressure PDN, an operation oil temperature sensor 67 for detecting an operation oil temperature TOIL, and a coolant temperature sensor 68 for detecting a coolant temperature TW of the engine 1. The ECU 50 performs control of the first and second control oil pressures PDR and PDN, and actuation control of the forward clutch 22, the reverse brake 23, and the lock-up clutch 17, according to the detected vehicle running speed VP, the operation amount AP of the accelerator pedal, the engine rotational speed NE, and the like.

The engine 1 is provided with well-known fuel injection valves, spark plugs, and a throttle valve, whose operation is controlled by an ECU 51 for engine control. The ECU 51 is connected with the ECU 50 through a data bus (not shown), which makes it possible for the ECU's 50 and 51 to mutually transmit and receive data required for the control. In this embodiment, the throttle valve 3 is configured so as to be actuated by an actuator 8, and the throttle valve opening TH is controlled by the ECU 51 so as to coincide with a target opening THCMD, which is calculated according to the accelerator pedal operation amount AP.

The ECU 51 performs an intake air amount control of the engine 1 by changing the throttle valve opening according to the accelerator pedal operation amount AP. Further, the ECU 51 performs a fuel injection amount control and an ignition timing control according to engine operating parameters such as the engine rotational speed NE, the intake pressure PBA, and the like, detected by the sensors including sensors which are not shown. Further, the ECU 51 performs the automatic stop of the engine 1 (hereinafter referred to as "idling stop") when a predetermined idling stop execution condition is satisfied. The predetermined idling stop execution condition is satisfied, for example, when the vehicle speed VP is equal to or lower than a predetermined vehicle speed, the accelerator pedal is not depressed (the accelerator pedal operation amount AP is equal to "0"), the brake pedal is depressed (the brake switch 64 is turned on), and the residual charge amount of the battery is greater than a predetermined amount.

Figure 2:
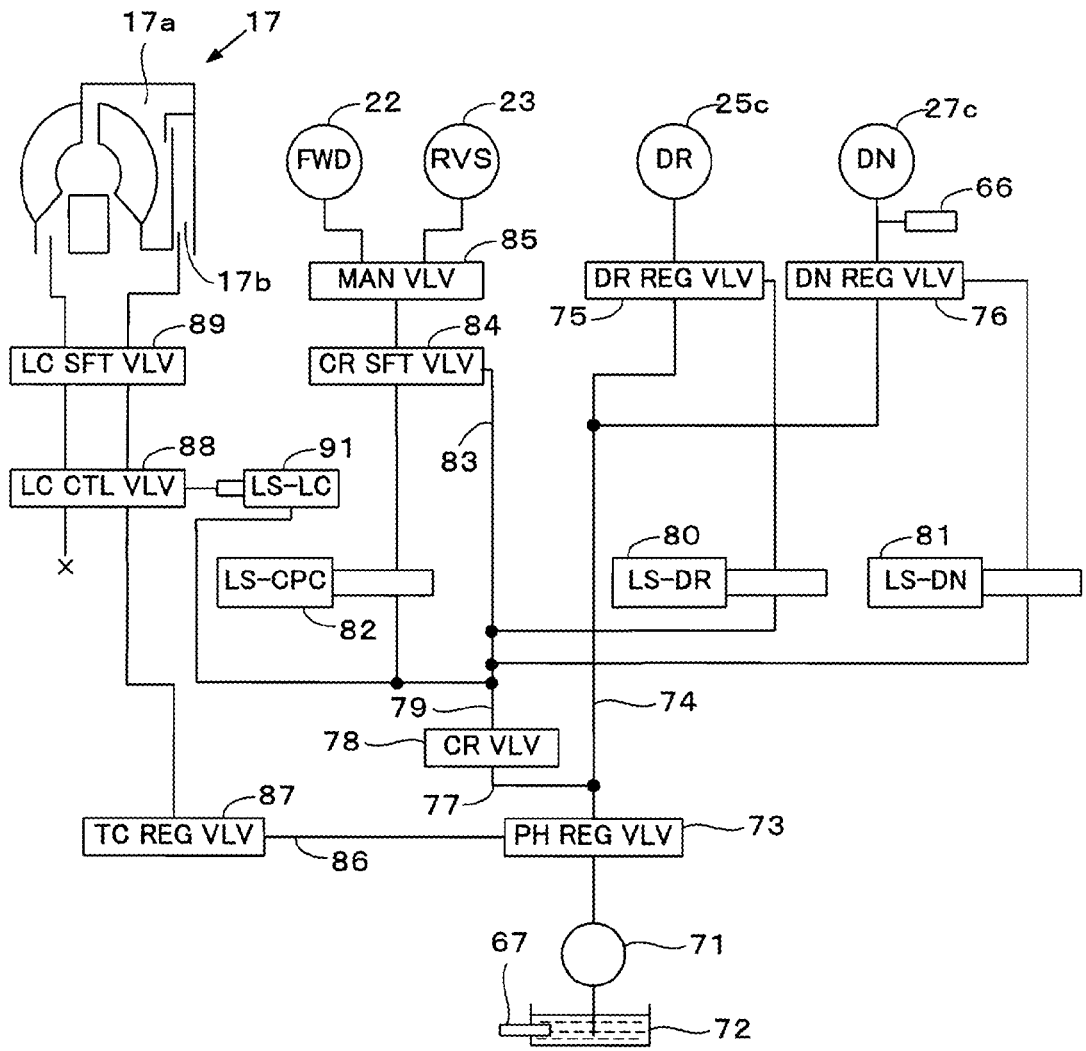

FIG. 2 shows a hydraulic circuit for illustrating a configuration of the oil pressure control device 40.

The oil pressure control device 40 is provided with an oil pump 71 driven by the engine 1, and the oil pump 71 pumps up the operation oil stored in a reservoir 72, and supplies the pressurized operation oil through a PH regulation valve (PH REG VLV) 73 to the cylinder chambers 25c and 27c of the CVT 4, the forward clutch 22, the reverse brake 23, and the lock-up clutch 17, which are described above.

The PH regulation valve 73 is connected through an oil passage 74 and regulator valves (DR REG VLV, DN REG VLV) 75 and 76 to the cylinder chambers 25c of the drive-pulley and to the cylinder chamber 27c of the driven-pulley in the CVT 4. The PH regulation valve 73 is further connected through an oil passage 77 to a CR valve (CR VLV) 78, and connected through an oil passage 86 to a TC regulator valve 87. Accordingly, the predetermined line pressure PH is supplied to the connected valves.

The CR valve 78 reduces the line pressure PH to generate a CR pressure (control pressure), and supplies the CR pressure to first to fourth linear solenoid valves 80, 81, 82, and 91. The first and second linear solenoid valves 80 and 81 applies the output pressure controlled by the ECU 50 to regulator valves 75 and 76, and the operation oil pressures supplied to the cylinder chambers 25c and 27c are regulated to the first and second control oil pressures PDR and PDN.

The CR pressure output from the CR valve 78 is supplied also to a CR shift valve (CR SFT VLV) 84 through an oil passage 83, and further supplied through a manual valve (MAN VLV) 85 to a pressure chamber of the forward clutch 22 and a pressure chamber of the reverse brake 23.

The manual valve 85 supplies the output pressure of the CR shift valve 84 to the pressure chambers of the forward clutch 22 and the reverse brake 23 according to a position of the shift lever (not shown) operated by the driver. The output pressure of the third linear solenoid valve 82 controlled by the ECU 50 is supplied to the CR shift valve 84, to control engagement and disengagement of the forward clutch 22 and the reverse brake 23.

The output pressure of the PH regulation valve 73 is supplied through an oil passage 86 to a TC regulator valve (TC REG VLV) 87, and the output pressure of the TC regulator valve 87 is supplied through an LC control valve (LC CTL VLV) 88 to an LC shift valve (LC SFT VLV) 89. The output pressure of the LC shift valve 89 is supplied to a pressure chamber 17a of the lock-up clutch 17 and a pressure chamber 17b which is provided on the back side of the chamber 17a.

If the operation oil is supplied through the LC shift valve 89 to the pressure chamber 17a and discharged from the pressure chamber 17b, the lock-up clutch 17 is engaged. If the operation oil is supplied to the pressure chamber 17b and discharged from the pressure chamber 17a, the lock-up clutch 17 is disengaged. The slip amount of the lock-up clutch 17 is determined by an amount of the operation oil supplied to the pressure chambers 17a and 17b.

The output pressure of the fourth linear solenoid valve 91 controlled by the ECU 50 is supplied to the LC control valve 88, and the slip amount (engagement degree) of the lock-up clutch 17 is controlled.

The driven-pulley control oil pressure sensor 66 described above is provided between the regulator valve 76 and the cylinder chamber 27c, and the operation oil temperature sensor 67 is provided in the reservoir 72.

Figure 3:
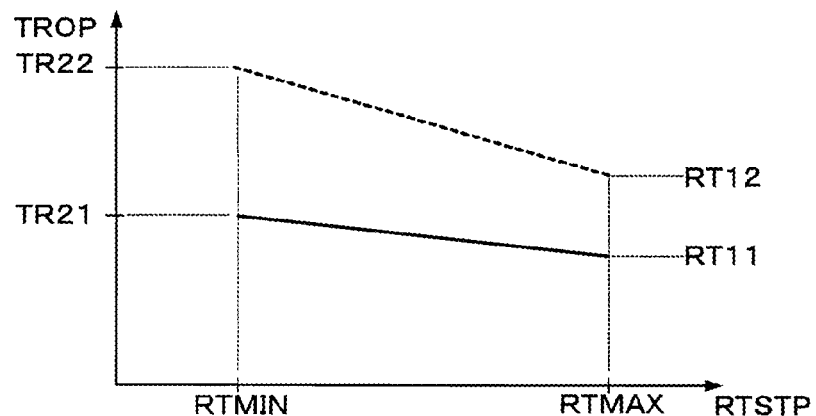
FIG. 3 A graph showing a relationship between a transmission ratio (RTSTP) upon starting idling stop and a rise time period (TROP) of an operation oil pressure at the time of terminating the idling stop (at the time of restarting) (first embodiment)

FIG. 3 shows a relationship between a transmission ratio upon starting the idling stop (hereinafter referred to as "stop transmission ratio RTSTP") and a rise time period TROP of the operation oil pressure (e.g., the second control oil pressure PDN) upon terminating the idling stop and restarting the engine. The shown relationship is obtained from the actually measured data. The rise time period TROP is a time period from the start time of restarting the engine to the time the operation oil pressure reaches a predetermined value.

The solid line shown in FIG. 3 corresponds to a case where the restart is performed immediately after the engine stoppage, and the broken line corresponds to the idling stop continuation time period TIS reaches a predetermined time period. RTMAX is a maximum transmission ratio (the most suitable transmission ratio upon vehicle start acceleration), and RTMIN is a minimum transmission ratio which may possibly be taken upon starting the idling stop.

The following points can be confirmed from the relationship shown in FIG. 3.

1) The rise time period TROP becomes longer as the idling stop continuation time period TIS increases.

2) The rise time period TROP becomes longer as the stop transmission ratio RTSTP decreases, if the idling stop continuation time period TIS is the same.

For example, when the stop transmission ratio RTSTP becomes less than the maximum transmission ratio RTMAX due to road surface condition and the brake depressing force of the driver upon vehicle deceleration, it is confirmed that the rise time period TROP of the operation oil pressure at the time of restarting the engine becomes longer.

Further, the rise time period TROP of the operation oil pressure tends to be longer as the operation oil temperature TOIL falls.

Accordingly, in this embodiment, the maximum continuation time period (continuable time period) TISMAX of the idling stop is set according to the stop transmission ratio RTSTP and the operation oil temperature TOIL, and the idling stop is forcibly terminated to restart the engine 1 when the idling stop continuation time period TIS reaches the maximum continuation time period TISMAX. This control makes it possible to maintain the rise time period TROP at a value within the allowable range and to restart the engine at an appropriate timing regardless of the stop transmission ratio RTSTP, so that good vehicle start performance can be obtained.

Figure 4:
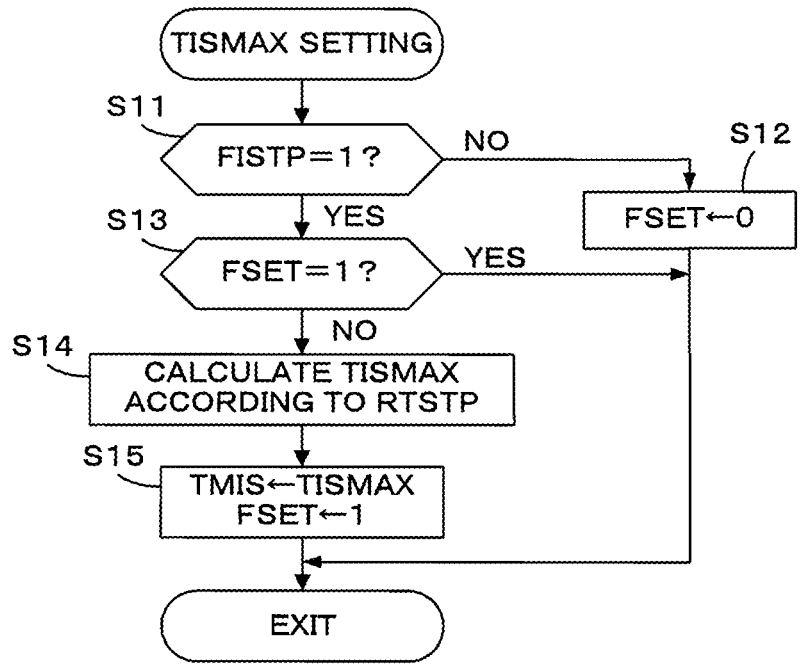
FIG. 4 A flowchart of a process for setting a continuable time period (TISMAX) of the idling stop FIG. 5 A graph showing a map referred to in the process of FIG. 4

FIG. 4 is a flowchart of a process for setting the maximum continuation time period TISMAX. This process is executed by the ECU 50 at predetermined time intervals.

In step S11, it is determined whether or not an idling stop flag FISTP is "1". The idling stop flag FISTP is set to "1" when the idling stop execution condition is satisfied. If the answer to step S11 is negative (NO), a setting completion flag FSET is set to "0" (step S12), and the process ends.

Figure 5:
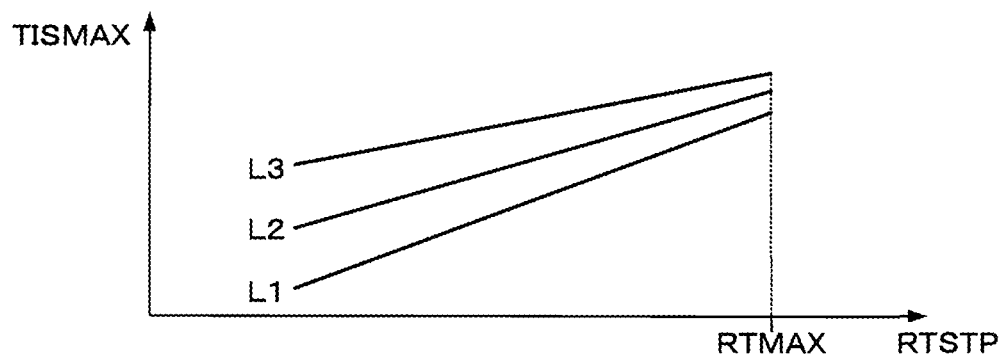

After the idling stop flag FISTP is set to "1", the process proceeds from step S11 to step S13, in which it is determined whether or not the setting completion flag FSET is "1". Initially, the answer to this step is negative (NO). Accordingly, the process proceeds to step S14, in which a TISMAX map shown in FIG. 5 is retrieved according to the stop transmission ratio RTSTP and the operation oil temperature TOIL, to calculate the maximum continuation time period TISMAX. The stop transmission ratio RTSTP is calculated as a ratio (NDR/NDN) of the output shaft rotational speed NDN and the pulley drive shaft rotational speed NDR which are detected before the vehicle stops.

The straight lines L1, L2, and L3 shown in FIG. 5 respectively correspond to a case where the operation oil temperature TOIL is equal to a first oil temperature TOIL1 (for example, a temperature lower than the normal temperature), a case where the operation oil temperature TOIL is equal to a second oil temperature TOIL2 (for example, the normal temperature), and a case where the operation oil temperature TOIL is equal to a third oil temperature TOIL3 (for example, a temperature higher than the normal temperature). That is, the TISMAX map is set so that the maximum continuation time period TISMAX increases as the operation oil temperature TOIL becomes higher, and the maximum continuation time period TISMAX decreases as the stop transmission ratio RTSTP decreases on the basis of the state where the stop transmission ratio RTSTP is equal to the maximum transmission ratio RTMAX. When retrieving the TISMAX map, a value corresponding to the detected operation oil temperature TOIL is calculated by appropriately performing interpolation.

In step S15, the down count timer TMIS is set to the maximum continuation time period TISMAX and started, and the setting completion flag FSET is set to "1". Accordingly, the answer to step S13 thereafter becomes affirmative (YES), and the process immediately ends. In other words, steps S14 and S15 are executed once immediately after the idling stop flag FISTP is set to "1".

Figure 6:
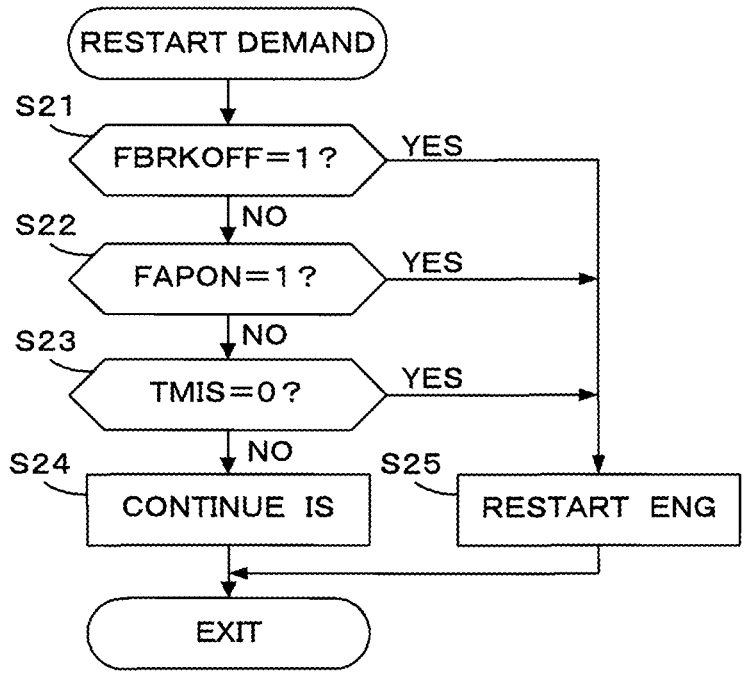
FIG. 6 A flowchart of a process for performing a restart demand during execution of the idling stop FIG. 7 A flowchart of a process for determining a temperature condition of an internal combustion engine (1) and the continuously variable transmission (4)

FIG. 6 is a flowchart of a restart demand process executed when performing the idling stop. This process is executed by the ECU 50 at predetermined time intervals when performing the idling stop.

In step S21, it is determined whether or not a brake-off flag FBRKOFF is "1". The brake-off flag FBRKOFF is set to "1" when the brake pedal is not depressed, and hence the brake switch 64 is in the OFF state. If the answer to step S21 is negative (NO), i.e., the brake pedal is depressed, it is determined whether or not an accelerator-on flag FAPON is "1" (step S22). The accelerator-on flag FAPON is set to "1" when the accelerator operation amount AP is greater than "0".

If the answer to step S22 is negative (NO), i.e., the accelerator pedal is not depressed, it is determined whether or not the value of the down count timer TMIS started in step S15 of FIG. 4 is equal to "0" (step S23). If the answer to this step is negative (NO), the idling stop is continued (step S24).

On the other hand, if any one of the answers to steps S21-S23 is affirmative (YES), the restart demand of the engine 1 is performed to the ECU 51 (i.e., termination of the idling stop is demanded) (step S25). That is, when the value of the timer TMIS is equal to "0" in step S23, i.e., the continuation time period of the idling stop reaches the maximum continuation time period TISMAX, the restart demand is performed even if the idling stop execution condition is satisfied. Then, the restart of the engine 1 is performed by the ECU 51 in response to the restart demand.

As described above, according to the processes of FIGS. 4 and 6, the maximum continuation time period TISMAX of the idling stop is set according to the stop transmission ratio RTSTP detected upon performing the idling stop of the engine 1, and the idling stop is terminated to restart the engine 1 when the idling stop continuation time period reaches the maximum continuation time period TISMAX. The rising characteristic of the operation oil pressure becomes worse upon restart of the engine if the stop transmission ratio RTSTP is on the high speed side (i.e., takes a value less than the maximum transmission ratio RTMAX). Accordingly, by setting the maximum continuation time period TISMAX according to the stop transmission ratio RTSTP, the restart of the engine 1 can be performed at an appropriate timing, thereby obtaining good vehicle start performance without depending on the stop transmission ratio RTSTP, in other words, regardless of the brake operation manner of the driver.

Further, as shown in FIG. 3, the rising characteristic of the operation oil pressure becomes worse (i.e., the rise time period TROP becomes longer) as the stop transmission ratio RTSTP decreases. Accordingly, by setting the maximum continuation time period TISMAX shorter as the stop transmission ratio RTSTP decreases, the restart of the engine can be performed at an appropriate timing.

Further, since leak of the operation oil decreases as the operation oil temperature TOIL becomes higher, the rising characteristic of the operation oil pressure upon restarting the engine is improved. Accordingly, the restart of the engine can be performed at an appropriate timing by setting the maximum continuation time period TISMAX to a greater value as the operation oil temperature TOIL becomes higher.

The rising characteristic of the operation oil pressure becomes the best in the state where the stop transmission ratio RTSTP is equal to the maximum transmission ratio RTMAX, i.e., the state where the transmission ratio is the most suitable for the vehicle start. Accordingly, by setting the TISMAX map on the basis of this state, the maximum continuation time period TISMAX can be set to an appropriate value.

Further, in this embodiment, the idling stop execution condition is satisfied before the vehicle speed VP becomes "0". Accordingly, the idling stop is started in the transient condition from the vehicle running state to the stopped state, and the maximum continuation time period TISMAX is set according to the stop transmission ratio RTSTP detected before the vehicle stops. Before the vehicle stops, the stop transmission ratio RTSTP can securely and correctly be detected based on the pulley drive shaft rotational speed NDR and the output shaft rotational speed NDN. Consequently, the maximum continuation time period TISMAX can be set appropriately.

In this embodiment, the operation oil temperature sensor 67 corresponds to the temperature detecting means, the pulley drive shaft rotational speed sensor 61, the output shaft rotational speed sensor 62, and the ECU 50 constitute the transmission ratio detecting means, the oil pressure control device 40 and the ECU 50 constitute the oil pressure control means, the ECUs 50 and 51 constitute the automatic stop control means, and the ECU 50 constitutes the continuable time period setting means.

Second Embodiment

In this embodiment, the function that TISMAX map used in the first embodiment is modified by learning is added in consideration of the point that the sealing characteristic of the seal ring for preventing leak of the operation oil deteriorates (aging deterioration) due to wear.

Specifically, when the answer to step S23 in the process of FIG. 6 is affirmative (YES) and restart of the engine 1 is performed, it is monitored whether or not a slip amount of the forward clutch 22 has exceeded a predetermined threshold value, and a specific set value of the TISMAX map is modified to be reduced by a subtraction modifying amount DTR when the slip amount has exceeded the predetermined threshold value. The specific set value subjected to the modification is determined according to the operation oil temperature TOIL and stop transmission ratio RTSTP detected at the time. As a parameter indicative of the slip state of the forward clutch 22, a difference rotational speed DNTD between the input shaft rotational speed NT and the pulley drive shaft rotational speed NDR is used. In addition, the subtraction modifying amount DTR may be set according to the parameter (DNTD) indicative of the slip state.

By modifying the TISMAX map as described above, the map set values are gradually changed according to the actual rising characteristic of the operation oil pressure, which makes it possible to perform restart of the engine at the optimum timing regardless of aging deterioration of the rising characteristic of the operation oil pressure upon restarting, to thereby maintain good vehicle start performance.

In this embodiment, the input shaft rotational speed sensor and the pulley drive shaft rotational speed sensor 61 constitute a part of the monitoring means, and the ECU 50 constitutes a part of the monitoring means and the modifying means.

[Modification]

In the above-described second embodiment, the slip amount of the forward clutch 22 is monitored, and the TISMAX map is modified according to the monitoring result. Alternatively, rise in the second control oil pressure PDN may be monitored and the TISMAX map may be modified according to the monitoring result. The reason is that the rising characteristic of the second control oil pressure PDN reflects the slip amount of the forward clutch.

Specifically, when the answer to step S23 in the process of FIG. 6 is affirmative (YES) and restart of the engine 1 is performed, it is monitored whether or not a determination pressure value PDNRS has exceeded a predetermined threshold value PDNRSTH, and the specific set value of the TISMAX map is modified to be reduced by the subtraction modifying amount DTR when the determination pressure value PDNRS has not exceeded the predetermined threshold value PDNRSTH. The determination pressure value PDNRS corresponds to the second control pressure PDN at the time a predetermined time period has elapsed from the time of beginning the restart of the engine.

In this modification, the driven pulley control oil pressure sensor 66 constitutes a part of the monitoring means, and the ECU 50 constitutes a part of the monitoring means and the modifying means.

Third Embodiment

In this embodiment, a temperature condition of the engine 1 and the CVT 4 is determined with the engine coolant temperature TW and the operation oil temperature TOIL which are detected, and the maximum continuation time period TISMAX is set to a fixed value (hereinafter referred to as "predetermined temperature condition value") TISMAXH which does not depend on the stop transmission ratio RTSTP, when the engine 1 and the CVT 4 are in a predetermined temperature condition. This embodiment is the same as the first embodiment except for the points described below.

Figure 7:
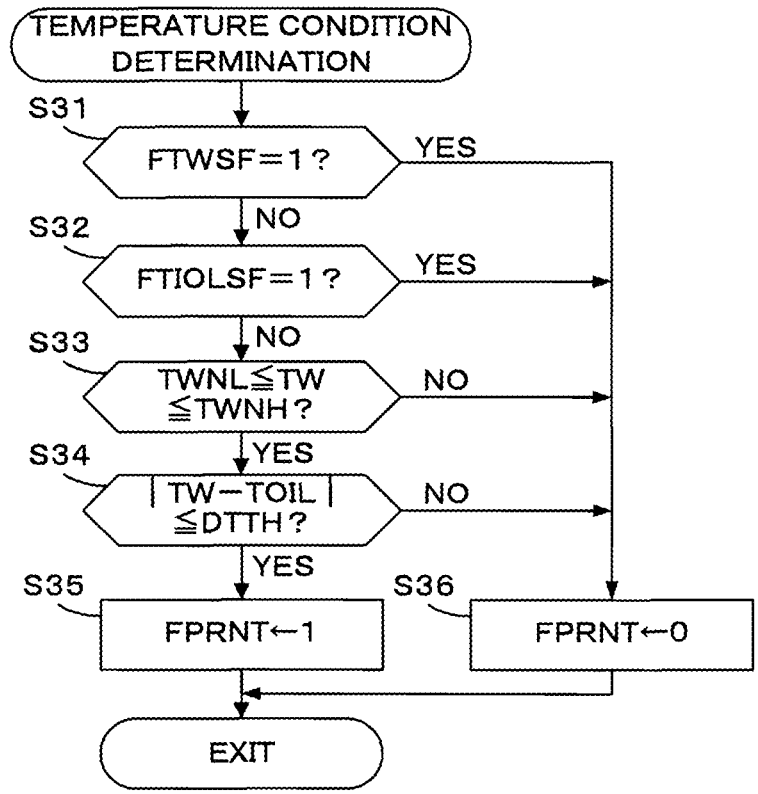

FIG. 7 is a flowchart of a process for determining the temperature condition of the engine 1 and the CVT 4, and this process is executed in the ECU 50 at predetermined time intervals.

In step S31, it is determined whether or not a failure detection flag FTWSF of the engine coolant temperature sensor 68 is "1", and it is determined whether or not a failure detection flag FTOILF of the operation oil temperature sensor 67 is "1" in step S32. These flags FTWSF and FTOILF are set to "1" when a failure of the corresponding sensor is detected in a failure determination process which is not shown.

If the answer to step S31 or step S32 is affirmative (YES), a temperature condition flag FPRNT is set to "0" (step S36). If both of the answers to steps S31 and S32 are negative (NO), the process proceeds to step S33, in which it is determined whether or not the engine coolant temperature TW is equal to or higher than a predetermined low coolant temperature TWNL (for example, 80 degrees centigrade) and equal to or lower than a predetermined high coolant temperature TWNH (for example, 90 degrees centigrade).

If the answer to step S33 is affirmative (YES), it is further determined whether or not the absolute value of a difference between the engine coolant temperature TW and the operation oil temperature TOIL is equal to or lower than a predetermined threshold value DTTH (step S34). If the answer to step S33 or step S34 is negative (NO), the process proceeds to step S36. If the answer to step S34 is affirmative (YES), the engine 1 and the CVT 4 are determined to be in a predetermined temperature condition, and the temperature condition flag FPRNT is set to "1" (step S35).

Figure 8:
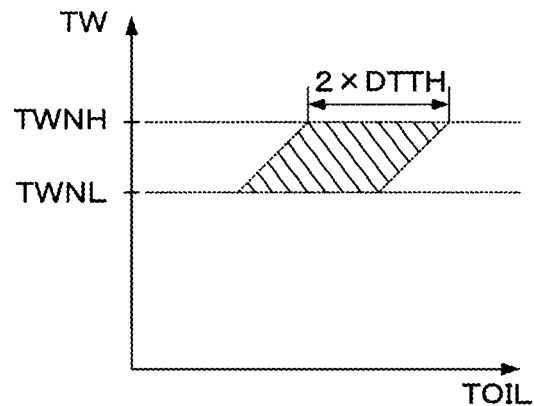
FIG. 8 A graph showing a temperature region corresponding to a predetermined temperature condition FIG. 9 A flowchart of a process for setting the continuable time period (TISMAX) of the idling stop (third embodiment)

The predetermined temperature condition can be shown in FIG. 8 by the region with hatching. It is to be noted that the predetermined threshold value DTTH is set, for example to a value around 10 degrees centigrade, so that an operating condition where the engine 1 is a high load condition and the CVT 4 is a low load condition, and an operating condition where the engine 1 is a low load condition and the CVT 4 is a high load condition, are not included in the predetermined temperature condition. Further, the high load condition of the CVT 4 specifically corresponds to the following conditions 1)-3), and the low load condition of the CVT 4 is a condition that corresponds neither of the following conditions 1)-3):

1) a condition where the lock-up clutch 17 of the torque converter 2 is disengaged upon hill-climbing, or the like;

2) a condition where the operation oil is too much agitated and air bubbles etc. are contained in the operation oil upon cruise-running at a high vehicle-speed, or the like; and 3) a condition where frequency of the gear shift is high.

Figure 9:
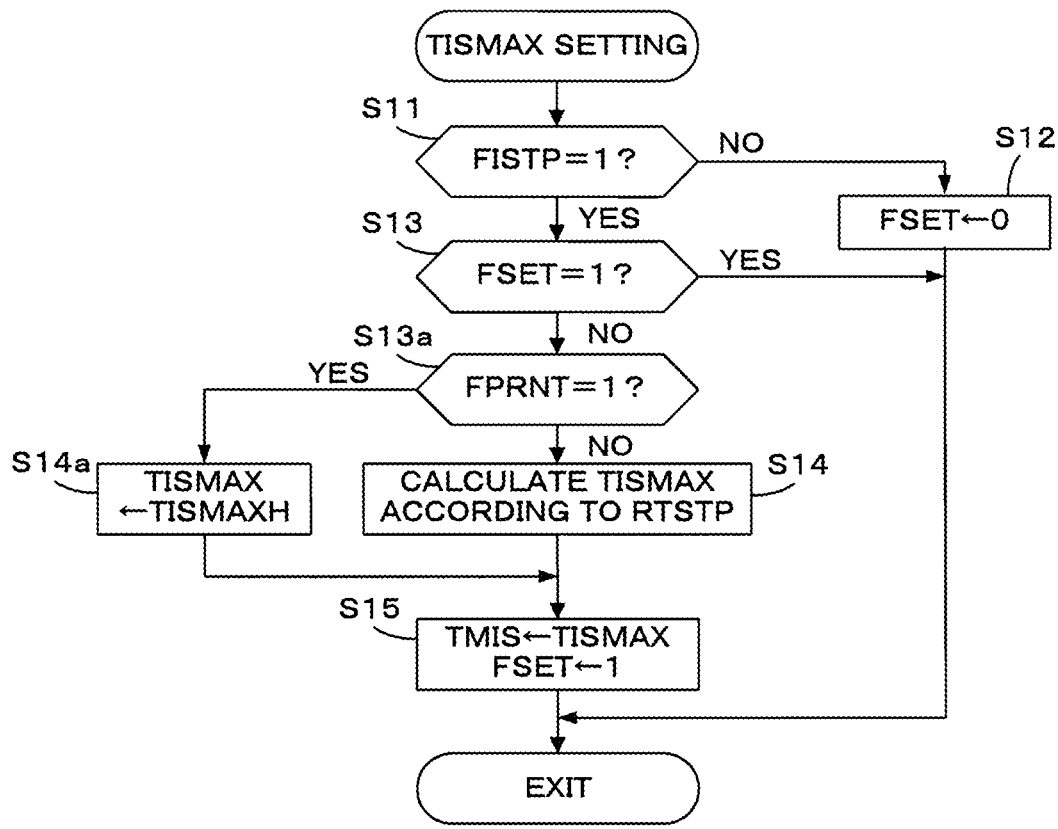

FIG. 9 is a flowchart of the TISMAX setting process in this embodiment, and this process is obtained by adding steps S13a and S14a to the process of FIG. 4.

In step S13a, it is determined whether or not the temperature condition flag FPRNT is "1". If the answer to this step is negative (NO), the process proceeds to step S14. If the temperature condition flag FPRNT is "1", the process proceeds from step S13a to step S14a, in which the maximum continuation time period TISMAX is set to the predetermined temperature condition value TISMAXH. The predetermined temperature condition value TISMAXH is set to a fixed value which is slightly greater than the maximum set value in the TISMAX map shown in FIG. 5, and independent of the stop transmission ratio RTSTP.

As described above, in this embodiment, when the engine 1 or the CVT 4 is not in the predetermined temperature condition (FPRNT=0), the maximum continuation time period TISMAX is set according to the stop transmission ratio RTSTP similarly to the first embodiment. On the other hand, when the engine 1 and the CVT 4 are in the predetermined temperature condition, the maximum continuation time period TISMAX is set to the predetermined temperature condition value TISMAXH. When the warming-up of the engine 1 is completed, and the engine 1 and the CVT 4 are in a stabilized temperature condition, leak of the operation oil decreases. Accordingly, setting the maximum continuation time period TISMAX to a fixed value (TISMAXH) does not deteriorate vehicle start performance. Consequently, by setting the maximum continuation time period TISMAX to the predetermined temperature condition value TISMAXH which is slightly greater than the map set value of FIG. 5, it is possible to enhance the fuel efficiency improving effect with the idling stop.

Further, when the engine restart is performed although the driver continues depressing the brake pedal, there is no change in the restart timing by setting the maximum continuation time period TISMAX to a fixed value, which makes it possible to reduce driver's sense of incongruity.

Further, by defining the predetermined temperature condition based on the two temperature parameters of the engine coolant temperature TW and the operation oil temperature TOIL, it is possible to determine the condition where both of the temperature conditions of the engine 1 and the CVT 4 are stabilized.

In this embodiment, the ECU 50 constitutes the operating condition determining means. Specifically, steps S33-S36 of FIG. 7 correspond to the operating condition determining means.

The present invention is not limited to the embodiments described above, and various modifications may be made. For example, in the above-described embodiments, the maximum continuation time period TISMAX is set according to the stop transmission ratio RTSTP and the operation oil temperature TOIL using the TISMAX map shown in FIG. 5. Alternatively, the maximum continuation time period TISMAX may be set, for example, using a table in which only the straight line L2 is set corresponding to the state where the operation oil temperature TOIL is equal to the second oil temperature TOIL2.

Further, the oil pressure sensor which monitors the operation oil pressure in the second embodiment is not limited to the above-described sensor which detects the driven pulley control oil pressure PDN, but a sensor which detects the drive pulley control pressure PDR, or an operation oil pressure supplied to the forward clutch 22 may be used.

Further, it is desirable to set the maximum continuation time period TISMAX according to an average value RTSTPAV of the stop transmission ratio RTSTP detected in the past, if the stop transmission ratio RTSTP is not able to be detected due to some cause. This makes it possible to appropriately set the maximum continuation time period TISMAX even if the stop transmission ratio RTSTP is not able to be detected upon starting the idling stop.

Further, in the above-described embodiment, the processes of FIG. 4 and FIG. 6 are executed in the ECU 50 for the transmission control. Alternatively, these processes may be executed in the ECU 51 for the engine control.

DESCRIPTION OF REFERENCE NUMERALS

1 Internal combustion engine
4 Continuously variable transmission
40 Oil pressure control device (oil pressure control means)
50 Electronic control unit for transmission control (oil pressure control means, transmission ratio detecting means, automatic stop control means, continuable time period setting means, monitoring means, modifying means, operating condition determining means)
51 Electronic control unit for engine control (automatic stop control means)
61 Pulley drive shaft rotational speed sensor (transmission ratio detecting means)
62 Output shaft rotational speed sensor (transmission ratio detecting means)
67 Operation oil temperature sensor (temperature detecting means)
71 Oil pump

The invention claimed is:

1. A control apparatus for a vehicle provided with an internal combustion engine, an oil pump actuated by said engine for pressurizing operation oil, and a belt-type continuously variable transmission to which the operation oil pressurized by said oil pump is supplied, said control apparatus comprising:

oil pressure control means for performing a transmission control by controlling an operation oil pressure supplied to said continuously variable transmission;

automatic stop control means for automatically stopping said engine when a predetermined condition is satisfied;

transmission ratio detecting means for detecting a transmission ratio of said continuously variable transmission; and continuable time period setting means for setting a continuable time period of the automatic stop of said engine by calculating a maximum value of the continuable time period of the automatic stop of the engine depending on the detected transmission ratio at the time the engine stops, wherein said automatic stop control means includes a timer for measuring a continuation time period of the automatic stop of said engine and terminates the automatic stop of said engine to restart said engine when the continuation time period reaches the continuable time period.

2. The control apparatus according to claim 1, further comprising operating condition determining means for determining whether said engine and said continuously variable transmission are in a predetermined operating condition, wherein said continuable time period setting means sets the continuable time period according to the detected transmission ratio when at least one of said engine or said continuously variable transmission is not in the predetermined operating condition, while said continuable time period setting means sets the continuable time period as different value from the continuable time period set according to the detected transmission ratio when said engine and said continuously variable transmission are in the predetermined operating condition.

3. The control apparatus according to claim 1, wherein said continuable time period setting means sets the continuable time period such that the continuable time period decreases as the detected transmission ratio decreases.

4. The control apparatus according to claim 1, further comprising temperature detecting means for detecting a temperature of the operation oil, wherein said continuable time period setting means sets the continuable time period such that the continuable time period increases as the operation oil temperature increases.

5. The control apparatus according to claim 1, wherein said continuable time period setting means calculates the continuable time period by using, as a standard, a state where the transmission ratio is maximum.

6. The control apparatus according to claim 1, wherein said automatic stop control means controls so that the automatic stop of said engine begins in a transition state where said vehicle shifts from a running state to a halting state, wherein said continuable time period setting means sets the continuable time period according to the transmission ratio detected immediately before said vehicle stops.

7. The control apparatus according to claim 1, wherein said vehicle is provided with a clutch disposed between an output shaft of said engine and an input shaft of said continuously variable transmission, said clutch being controlled using the operation oil pressurized by said oil pump, said control apparatus further comprising monitoring means for monitoring a difference rotational speed between an input rotational speed and an output rotational speed of said clutch, when the continuation time period of the automatic stop of said engine reaches the continuable time period, the automatic stop ends, and the clutch is engaged, wherein said continuable time period setting means includes modifying means for modifying a setting characteristic of the continuable time period corresponding to the transmission ratio according to the monitored difference rotational speed monitored by said monitoring means.

8. The control apparatus according to claim 1, wherein said continuable time period setting means sets the continuable time period according to an average value of detected past values of the transmission ratio, when the transmission ratio is not able to be detected upon automatically stopping said engine.

9. The control apparatus according to claim 2, wherein the predetermined operating condition is a condition where a temperature difference between a coolant temperature of said engine and a temperature of the operation oil is within a predetermined range, wherein said continuable time period setting means sets the continuable time period to a greater value than the continuable time period that is set according to the detected transmission ratio, when said engine and said continuously variable transmission are in the predetermined operating condition.

10. The control apparatus according to claim 9, wherein said continuable time period setting means set the continuable time period to a fixed value which does not depend on the detected transmission ratio, when said engine and said continuously variable transmission are in the predetermined operating condition.

11. The control apparatus according to claim 2, wherein said continuable time period setting means sets the continuable time period such that the continuable time period decreases as the transmission ratio decreases.

12. The control apparatus according to claim 2, further comprising temperature detecting means for detecting a temperature of the operation oil, wherein said continuable time period setting means sets the continuable time period such that the continuable time period increases as the operation oil temperature increases.

13. The control apparatus according to claim 2, wherein said continuable time period setting means calculates the continuable time period by using, as a standard, a state where the transmission ratio is maximum.

14. The control apparatus according to claim 2, wherein said automatic stop control means controls so that the automatic stop of said engine begins in a transition state where said vehicle shifts from a running state to a halting state, wherein said continuable time period setting means sets the continuable time period according to the transmission ratio detected immediately before said vehicle stops.

15. The control apparatus according to claim 2, wherein said vehicle is provided with a clutch disposed between an output shaft of said engine and an input shaft of said continuously variable transmission, said clutch being controlled using the operation oil pressurized by said oil pump, said control apparatus further comprising monitoring means for monitoring a difference rotational speed between an input rotational speed and an output rotational speed of said clutch, when the continuation time period of the automatic stop of said engine reaches the continuable time period, the automatic stop ends, and the clutch is engaged, wherein said continuable time period setting means includes modifying means for modifying a setting characteristic of the continuable time period corresponding to the transmission ratio according to the monitored difference rotational speed monitored by said monitoring means.

16. The control apparatus according to claim 2, wherein said continuable time period setting means sets the continuable time period according to an average value of detected past values of the transmission ratio, when the transmission ratio is not able to be detected upon automatically stopping said engine.

* * * * *